(12) United States Patent
Kubota et al.

(10) Patent No.: US 10,946,514 B2
(45) Date of Patent: Mar. 16, 2021

(54) CONTROLLER, WORK CONTROL UNIT, MULTI-AXIS MOTION CONTROL UNIT, AND DRIVE CONTROL UNIT

(71) Applicant: Kabushiki Kaisha Yaskawa Denki, Kitakyushu (JP)

(72) Inventors: Yumie Kubota, Kitakyushu (JP); Shinichi Maehara, Kitakyushu (JP); Hajime Kimura, Kitakyushu (JP); Naoki Mizuno, Kitakyushu (JP); Ken Nakamura, Kitakyushu (JP)

(73) Assignee: Kabushiki Kaisha Yaskawa Denki, Kitakyushu (JP)

( * ) Notice: Subject to any disclaimer, the term of this patent is extended or adjusted under 35 U.S.C. 154(b) by 43 days.

(21) Appl. No.: 15/691,841

(22) Filed: Aug. 31, 2017

(65) Prior Publication Data

US 2018/0065245 A1 Mar. 8, 2018

(30) Foreign Application Priority Data

Sep. 2, 2016 (JP) .............................. JP2016-172295

(51) Int. Cl.
   - *B25J 9/16* (2006.01)
   - *G05B 19/05* (2006.01)
   - *G05B 19/414* (2006.01)

(52) U.S. Cl.
   CPC .............. *B25J 9/161* (2013.01); *G05B 19/05* (2013.01); *G05B 19/4141* (2013.01)

(58) Field of Classification Search
   CPC .. G05B 19/409; G05B 19/414; G05B 19/416; G05B 2219/34071; G05B 2219/34208; G05B 2219/34256; G05B 2219/34282; G05B 2219/42176
   See application file for complete search history.

(56) References Cited

U.S. PATENT DOCUMENTS

| | | | |
|---|---|---|---|
| 10,488,851 B2 * | 11/2019 | Hosek | ................ G05B 19/4148 |
| 2004/0044433 A1 | 3/2004 | Kamishio | |
| 2004/0249484 A1 | 12/2004 | Paillard | |
| 2006/0161300 A1 | 7/2006 | Gonzalez-Banos et al. | |

(Continued)

FOREIGN PATENT DOCUMENTS

| | | | |
|---|---|---|---|
| JP | S64-017103 A | 1/1989 | |
| JP | 06-79668 A | 3/1994 | |

(Continued)

OTHER PUBLICATIONS

Office Action dated Dec. 25, 2018 in corresponding Japanese Patent Application No. 2016-172295 (with English Translation), 12 pages.

(Continued)

*Primary Examiner* — Ryan Rink
(74) *Attorney, Agent, or Firm* — Oblon, McClelland, Maier & Neustadt, L.L.P.

(57) ABSTRACT

A controller includes control function circuits that are connected to each other and control a multi-axis control machine. Each of the control function circuits performs a respective control function upon receipt of a control signal from another control function circuit of the control function circuits, and the control signal corresponds to a predetermined interface standard determined from the control function.

9 Claims, 4 Drawing Sheets

(56) References Cited

U.S. PATENT DOCUMENTS

| | | | | |
|---|---|---|---|---|
| 2011/0071672 | A1* | 3/2011 | Sanders | B25J 9/161 |
| | | | | 700/245 |
| 2014/0060233 | A1* | 3/2014 | Gomi | B25J 9/1638 |
| | | | | 74/490.05 |
| 2014/0067120 | A1* | 3/2014 | Gomi | B25J 9/1638 |
| | | | | 700/254 |
| 2014/0306643 | A1 | 10/2014 | Kaku et al. | |
| 2014/0350723 | A1* | 11/2014 | Prieto | G05B 19/409 |
| | | | | 700/248 |
| 2017/0067728 | A1* | 3/2017 | Iwatake | G01B 5/004 |
| 2017/0310502 | A1* | 10/2017 | Shimizu | H04L 12/66 |

FOREIGN PATENT DOCUMENTS

| | | |
|---|---|---|
| JP | H06-187017 A | 7/1994 |
| JP | 8-110805 A | 4/1996 |
| JP | 9-265309 A | 10/1997 |
| JP | 2004-13239 A | 1/2004 |
| JP | 2004-537135 A | 12/2004 |
| JP | 2006-500228 A | 1/2006 |
| JP | 2006-313559 A | 11/2006 |
| JP | 2006-338219 A | 12/2006 |
| JP | 2008-097323 A | 4/2008 |
| JP | 2012-14707 A | 1/2012 |
| JP | 2015-13351 A | 1/2015 |
| JP | 2015-162124 A | 9/2015 |
| WO | WO 2013/099032 A1 | 7/2013 |

OTHER PUBLICATIONS

Japanese Office Action dated Aug. 5, 2019 in Patent Application No. 2016-172295 (with unedited computer generated English translation), 10 pages.

Japanese Office Action dated Mar. 19, 2020 in Japanese Patent Application No. 2016-172295, 11 pages.

Office Action dated Jun. 18, 2020 in corresponding Chinese Patent Application No. 201710621777.3 with English Translation.

Office Action dated Dec. 2, 2020 in corresponding Japanese Patent Application 2016-172295 with English Translation.

* cited by examiner

FIG. 2

FIG. 3 Comparative Example

CONTROLLER, WORK CONTROL UNIT, MULTI-AXIS MOTION CONTROL UNIT, AND DRIVE CONTROL UNIT

CROSS-REFERENCE TO RELATED APPLICATIONS

The present application claims priority under 35 U.S.C. § 119 to Japanese Patent Application No. 2016-172295, filed Sep. 2, 2016. The contents of this application are incorporated herein by reference in their entirety.

BACKGROUND OF THE INVENTION

Field of the Invention

The embodiments disclosed herein relate to a controller, a work control unit, a multi-axis motion control unit, and a drive control unit.

Description of Background Art

JP2008-97323A1 discloses a motion control system that includes a programmable logic controller (PLC), a motion controller, and a servo driver that are assigned their own processing to control motion of a machine.

SUMMARY OF INVENTION

According to one aspect of the present disclosure, a controller includes control function circuits that are connected to each other and control a multi-axis control machine. Each of the control function circuits performs a respective control function upon receipt of a control signal from another control function circuit of the control function circuits, and the control signal corresponds to a predetermined interface standard determined from the control function.

According to another aspect of the present disclosure, a work control device includes a work control circuit that, upon receipt of a control signal from another control circuit connected to the work control circuit, executes a work control function that controls work that is to be performed by a multi-axis control machine. The control signal corresponds to a work control interface standard determined from the work control function.

According to yet another aspect of the present disclosure, a multi-axis motion control device includes a multi-axis motion control circuit that, upon receipt of a control signal from another control circuit connected to the multi-axis motion control circuit, executes a motion control function that controls a motion of each of drive axes of a multi-axis control machine. The control signal corresponds to a motion control interface standard determined from the motion control function.

According to still another aspect of the present disclosure, a drive control device includes a drive control circuit that, upon receipt of a control signal from another control circuit connected to the drive control circuit, executes a drive control circuit that controls power feed driving of each of drive axes of a multi-axis control machine. The control signal corresponds to a motion control interface standard determined from the drive control function.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

The embodiments will now be described with reference to the accompanying drawings, wherein like reference numerals designate corresponding or identical elements throughout the various drawings.

Schematic Configuration of Robot System

Figure 1:
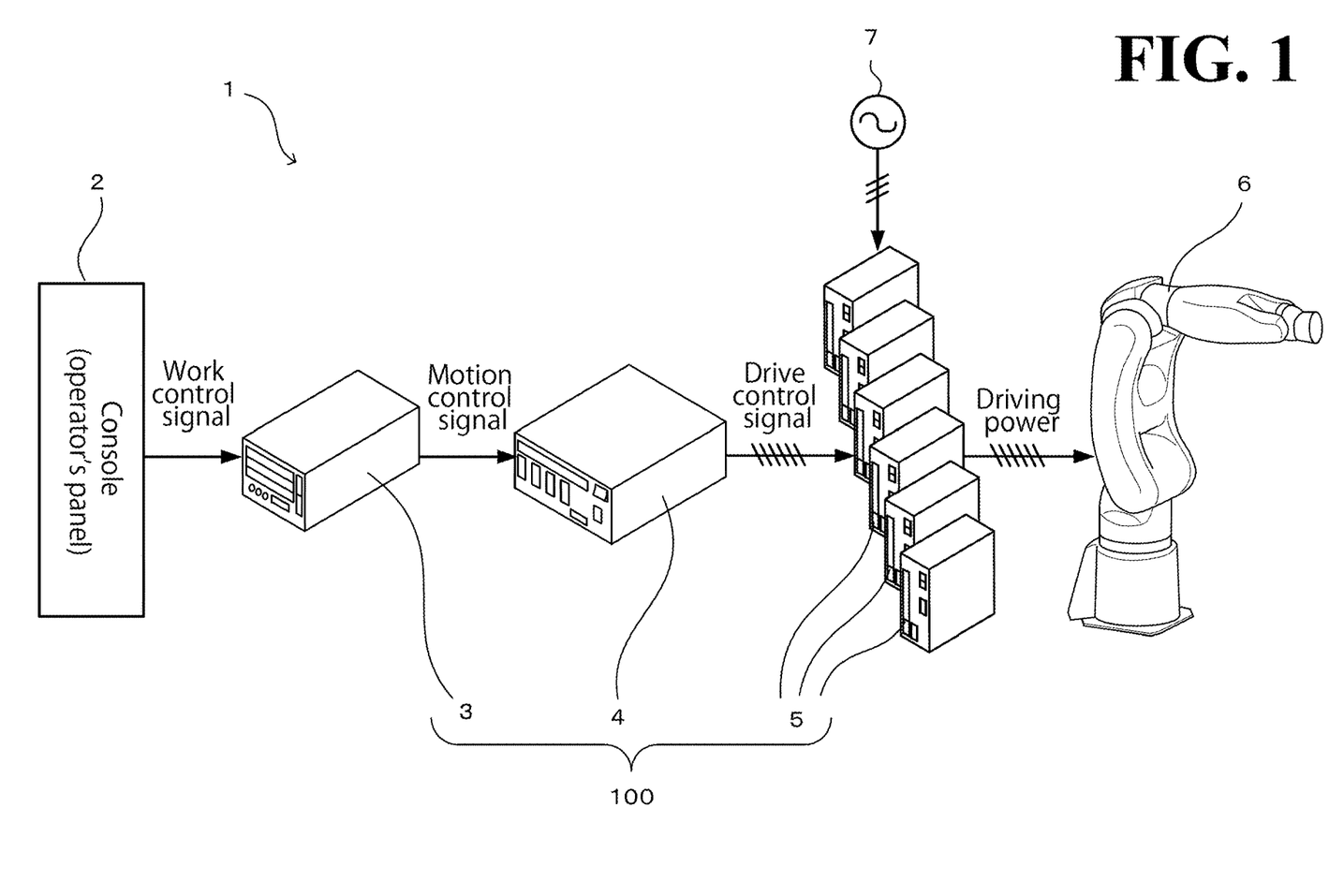
FIG. 1 is a schematic of a hardware unit configuration of a robot system that includes a controller according to an embodiment.

FIG. 1 is a schematic of a hardware unit configuration of a robot system 1, which includes a controller according to this embodiment. The robot system 1 causes a work robot 6 (which is a non-limiting example of the multi-axis control machine recited in the appended claims) to perform a predetermined kind of work as instructed by a user handling a console 2. As illustrated in FIG. 1, the robot system 1 includes the console 2, a work control unit 3, a multi-axis motion control unit 4, a plurality of drive control units 5, and the work robot 6.

The console 2 is an operation panel that receives an operation input from the user of the robot system 1 to cause the work robot 6 to start the predetermined kind of work and that outputs to the work control unit 3 a work control signal that is based on the operation input. The console 2 also has a function to display various kinds of information input from the work control unit 3, as described later.

The work control unit 3 (which is a non-limiting example of the control function unit and the work control unit recited in the appended claims) is an arithmetic and/or logic processing unit that controls, based on the work control signal input from the console 2, the work that is to be performed by the work robot 6. A non-limiting example of the work is a time-series sequence (procedure) for changing the position and/or posture of the leading end of an arm of the work robot 6. Another non-limiting example of the work is a time-series sequence (procedure) for moving an end effector (such as robot hand, not illustrated) mounted on the leading end of the arm. The work control unit 3 outputs a motion control signal to the multi-axis motion control unit 4 according to the time-series procedure for the work. While in this embodiment the subject of control by the work control unit 3 is the work robot 6, the work control unit 3 may control any other kind of multi-axis control machine.

The multi-axis motion control unit 4 (which is a non-limiting example of the control function unit and the multi-axis motion control unit recited in the appended claims) is an arithmetic and/or logic processing unit that controls, based on the motion control signal input from the work control unit 3, a motion of each of a plurality of drive motors (which are non-limiting examples of the plurality of drive axes recited in the appended claims), not illustrated, of the work robot 6 so as to enable the work robot 6 to perform the work (such as changing the position and/or posture of the leading end of the arm). A non-limiting example of the motion is to change, in time order, the rotation angle, rotation speed, or torque of the drive motor. At every change in time order of the motion, the multi-axis motion control unit 4 outputs drive control signals to the plurality of drive control units 5.

The plurality of drive control units 5 (which are non-limiting examples of the control function unit and the drive control unit recited in the appended claims) are what are called servo amplifiers. The servo amplifiers are same in number as the drive motors of the work robot 6 (six servo amplifiers are provided in this embodiment, as described later) and are dedicated to corresponding, individual drive motors of the work robot 6. Based on the drive control signals input from the multi-axis motion control unit 4, the plurality of drive control units 5 control power feeding driving of the corresponding, individual drive motors so as to implement the motion (rotation angle, rotation speed, or torque) controlled by the multi-axis motion control unit 4. In this embodiment, each drive control unit 5 controls the power feeding driving by: converting AC (Alternating-Current) power fed from an external power source 7 into DC (Direct-Current) power using a converter (not illustrated) provided in the drive control unit 5; converting the DC power into predetermined AC driving power through pulse width modulation (PWM) control that is based on the drive control signal using an inverter (not illustrated) provided in the drive control unit 5; and feeding the AC driving power to the corresponding drive motor. In another possible embodiment, the plurality of drive control units 5 are accommodated in a common housing to control driving of the corresponding, individual drive motors.

The work robot 6 (which is a non-limiting example of the multi-axis control machine recited in the appended claims) is a manipulator that includes six drive motors, in this embodiment, that cooperate with each other to control the position and posture of the leading end of the arm on a setting coordinate system. In another possible embodiment, an end effector such as a robot hand, not illustrated, is mounted on the leading end of the arm. The robot controlled by the robot system 1 will not be limited to the six-axis vertical multi-articular robot illustrated in FIG. 1. Other examples of the robot controllable by the robot system 1 include, but are not limited to, parallel link robots driven by three or more drive motors cooperating with each other, horizontal multi-articular robots (SCARA robots), cartesian coordinate robots, cylindrical coordinate robots, and other kinds of multi-axis control machines driven by two or more drive motors cooperating with each other, such as numerical control (NC) units, stage units, and linear sliders.

In the robot system 1 with this configuration, the work control unit 3, the multi-axis motion control unit 4, and the plurality of drive control units 5 are collectively referred to as controller 100. The controller 100 serves functions of a control unit, such as performing various kinds of arithmetic and/or logic processing and power control that are directly associated with control of the work robot 6. The console 2 sends a work control signal to the controller 100. The work control signal is a command specifying the kind of work to be performed by the work robot 6 and when to start the work. The console 2 also displays, for the user, various kinds of information input from the controller 100. Examples of the displayed information include, but are not limited to, rotation angles and rotation speeds of the drive motors of the work robot 6, the rotation angles and rotation speeds being detected by encoders (not illustrated) provided in the drive motors; driving power (equivalent to torque) detected by current sensors (such as Hall effect sensors, not illustrated) provided in the plurality of drive control units 5; and results of the various kinds of arithmetic and/or logic processing.

The work control unit 3, the multi-axis motion control unit 4, and the plurality of drive control units 5 are independent device units (which are non-limiting examples of the control function units recited in the appended claims) and are connected to each other so that signals can be sent and received between the device units. In the embodiment of FIG. 1, the device units are accommodated in their own housings. In another possible embodiment, some or all of the device units are accommodated in a common housing. The connection buses through which signals are sent and received between the device units are preferably compliant with general communications standards such as the RS232C standard, Ethernet (®) standards, the PCI Express (®) standard, and MECHATROLINK (®) standards. Compliance with these standards makes the connection buses compatible with each other in hardware and communications protocols.

Software System Configuration of the Controller according to the Embodiment

Figure 2:
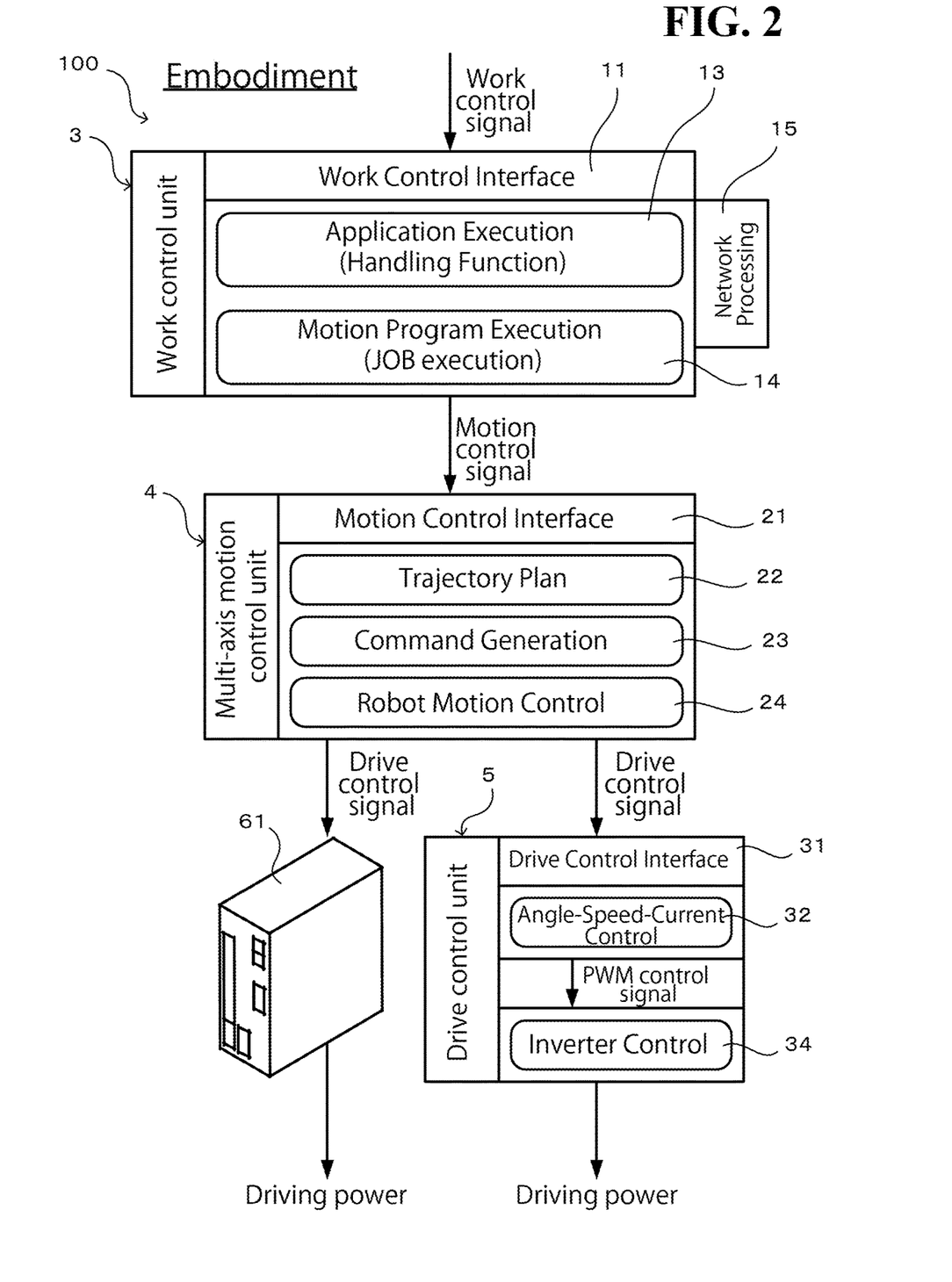
FIG. 2 illustrates an exemplary software system configuration of the controller according to the embodiment.

The arithmetic and/or logic processing unit constituting the work control unit 3, the arithmetic and/or logic processing unit constituting the multi-axis motion control unit 4, and some of the plurality of drive control units 5 are computers that include CPU, ROM, and RAM. In this embodiment, the computers constituting these device units perform software processing to implement functions specified in the processing blocks illustrated in FIG. 2. Referring to FIG. 2, the work control unit 3 implements control functions specified in the processing blocks of Work Control Interface 11, Application Execution 13, Motion Program Execution 14, and Network Processing 15.

At Work Control Interface 11, the work control unit 3 receives a work control signal from the console 2, and at the other processing blocks, performs work corresponding to the work control signal.

Application Execution 13 is a processing block that provides a function suitable for the work that is to be performed by the work robot 6. In FIG. 2, handling is specified as an example of the work that is to be performed by the work robot 6. Handling is an application in which robots can be used and is a general term of work involving holding or sucking a workpiece by the robot hand at the leading end of the arm of the work robot 6 and then moving the arm of the work robot 6 to convey the workpiece from the original position to a different position. In FIG. 2, handling is denoted as "Handling Function". It is noted that the "Handling Function" is an exemplary processing block corresponding to the application in which the work robot 6 is used, and that when the work robot 6 is used in some other application, the "Handling Function" may be replaced with, for example, "arc welding function" or "spot welding function".

The "Handling Function" provides a necessary and sufficient function for handling. Details of the "Handling Function" include causing the robot hand to perform open-close motion (which is necessary when holding a workpiece), driving the air cylinder of the robot hand (which is necessary when sucking a workpiece), and obtaining from a sensor (such as a camera, not illustrated) information indicating the position and/or posture of the workpiece. When the "Handling Function" is replaced with the "arc welding function" or the "spot welding function", either function provides a necessary and sufficient function for the intended purpose. Details of the "arc welding function" include sending a command to the welding power source for welding voltage or welding current, driving a welding wire feeder, and causing the work robot 6 to perform weaving motion. Details of the "spot welding function" include specifying the level of workpiece pressing force for a spot welding gun mounted on the leading end of the arm of the work robot 6, and grinding the electrodes of the spot welding gun.

At Motion Program Execution 14, the work control unit 3 interprets and executes a motion program so as to use the function specified at Application Execution 13 to implement a predetermined kind of work. The motion program is a file that describes a plurality of positions to which the leading end of the arm of the work robot 6 is to move and a predetermined time-series procedure for the open-close motion of the robot hand. When the multi-axis control machine to be controlled is other than a robot, the work control unit 3 executes a program prepared for work that the multi-axis control machine is to perform. The motion program for the work robot 6 will be referred to as "JOB", in which case the "Motion Program Execution" will be referred to as "JOB Execution".

At Network Processing 15, the work control unit 3 establishes network communication with external devices such as a PLC and a general-purpose PC.

The computer of the work control unit 3 rewrites the processing block of Application Execution 13 and the processing block of Motion Program Execution 14. Specifically, the computer of the work control unit 3 selects a program to implement the work corresponding to each of these processing blocks, installs the program in the processing block, and executes the program. In this manner, based on the work control signal input into the work control unit 3, the work control unit 3 outputs a motion control signal corresponding to the intended work. The control functions implemented by the processing blocks of Application Execution 13, Motion Program Execution 14, and Network Processing 15 are non-limiting examples of the work control function recited in the appended claims.

The multi-axis motion control unit 4 implements control functions specified in the processing blocks of Motion Control Interface 21, Trajectory Plan 22, Command Generation 23, and Robot Motion Control 24.

At Motion Control Interface 21, the multi-axis motion control unit 4 receives the motion control signal from the work control unit 3, and at the other processing blocks, performs a motion corresponding to the motion control signal.

At Trajectory Plan 22, in order to implement the motion, the multi-axis motion control unit 4 calculates a trajectory that the leading end of the arm should follow on a setting coordinate system.

At Command Generation 23, in order to cause the leading end of the arm to follow the trajectory calculated at Trajectory Plan 22, the multi-axis motion control unit 4 performs what is called inverse kinematics to generate an angle command, a speed command, or a torque command for the drive motors of the work robot 6.

At Robot Motion Control 24, in order to smoothen the movement of the leading end of the arm on the trajectory, the multi-axis motion control unit 4 corrects the angle command, the speed command, or the torque command. For example, the level of torque required for driving a predetermined joint axis of the work robot 6 depends on the turning angle of the leading end-side joint axis next to the predetermined joint axis (that is, depends on the posture of the leading end of the arm). The multi-axis motion control unit 4, at Robot Motion Control 24, corrects the torque command taking into consideration this moment changeability inherent in robots or corrects the commands to minimize vibration. This configuration improves the motion-track accuracy of the work robot 6.

The computer of the multi-axis motion control unit 4 executes programs to implement the respective processing blocks. In this manner, based on the motion control signal input into the multi-axis motion control unit 4, the multi-axis motion control unit 4 outputs to the drive control units 5 drive control signals corresponding to the intended motions of the drive motors. As necessary, each drive control unit 5 may change the content of the drive control signal to control a general-purpose servo amplifier 61. The control functions implemented by the processing blocks of Trajectory Plan 22, Command Generation 23, and Robot Motion Control 24 are non-limiting examples of the motion control function recited in the appended claims.

The drive control unit 5 implements control functions specified in the processing blocks of Drive Control Interface 31, Angle-Speed-Current Control 32, and Inverter Control 34.

At Drive Control Interface 31, the drive control unit 5 receives the drive control signal input from the multi-axis motion control unit 4, and at the other processing blocks, performs feeding control corresponding to the drive control signal.

At Angle-Speed-Current Control 32, the drive control unit 5 outputs a PWM control signal corresponding to the drive control signal through a position feedback loop, a speed feedback loop, and a current feedback loop.

At Inverter Control 34, based on the PWM control signal input from Angle-Speed-Current Control 32, the drive control unit 5 controls DC-to-AC power conversion using the inverter provided in the drive control unit 5, and outputs the AC power to the drive motor to drive the drive motor. Inverter Control 34 may be implemented by hardware such as a gate drive circuit operable by the PWM control signal.

The end effector, such as a robot hand, on the leading end of the arm of the work robot 6 may be equivalent to the drive motor as a control target controlled by the work control unit 3 and the multi-axis motion control unit 4. In this respect, the drive control unit to control the driving of the end effector has a configuration that is different from the drive control unit 5, which controls the drive motor, and that is based on specifications of the end effector. The control functions implemented by the processing blocks of Angle-Speed-Current Control 32 and Inverter Control 34 are non-limiting examples of the drive control function recited in the appended claims.

Software System Configuration of Controller according to Comparative Example

Figure 3:
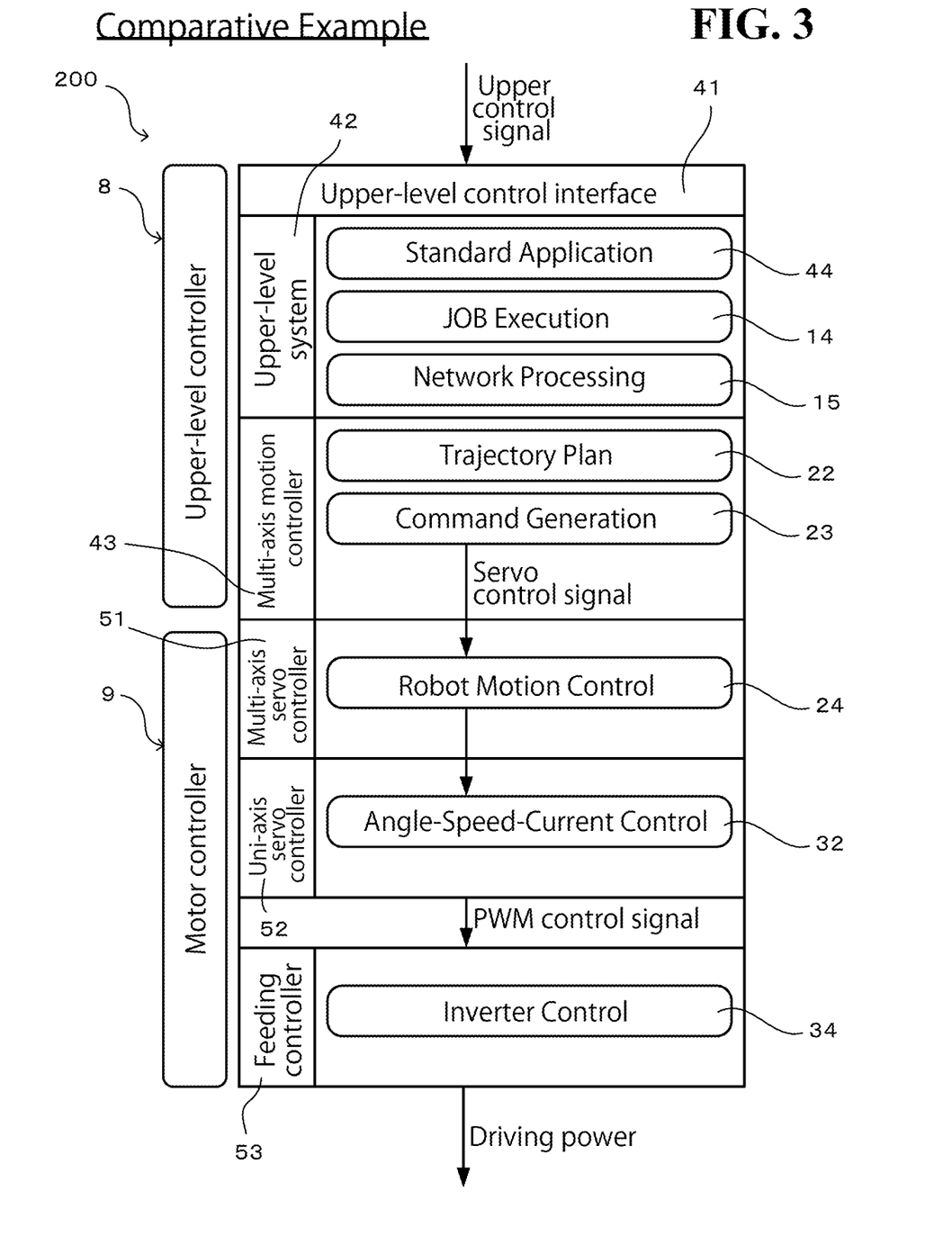
FIG. 3 illustrates an exemplary software system configuration of a controller according to a comparative example.

The work control unit 3, the multi-axis motion control unit 4, and the drive control units 5 are connected to each other to constitute the controller 100 according to this embodiment. Features of the controller 100 will be described by way of comparison with a controller 200 according to comparative example. The controller 200 is implemented by a collection of processing blocks illustrated in FIG. 3. As illustrated in FIG. 3, for the sake of description, the collection of processing blocks of the controller 200 according to the comparative example is broadly divided into an upper-level controller 8 and a motor controller 9 according to function. The upper-level controller 8 and the motor controller 9 are connected to each other so that signals can be sent and received between the upper-level controller 8 and the motor controller 9.

In the comparative example illustrated in FIG. 3, the upper-level controller 8 implements control functions specified in the processing blocks of an upper-level control interface 41, an upper-level system 42, and a multi-axis motion controller 43. With this configuration, the upper-level controller 8 generates a servo control signal based on an upper-level control signal input from the console 2, and outputs the servo control signal to the motor controller 9.

At the upper-level control interface 41, the upper-level controller 8 receives the upper-level control signal input from the console 2, and at the other processing blocks, performs work corresponding to the upper-level control signal.

At the upper-level system 42, the upper-level controller 8 implements control functions specified in the processing blocks of Standard Application 44, JOB Execution 14, and Network Processing 15. Standard Application 44 is a processing block implemented by a program prepared on an application basis. Examples of the application include, but are not limited to, arc welding, spot welding, and handling. The processing block of JOB Execution 14 and the processing block of Network Processing 15 are respectively similar to the processing block of JOB Execution 14 and the processing block of Network Processing 15 described in the embodiment.

The multi-axis motion controller 43 implements control functions specified in the processing blocks of Trajectory Plan 22 and Command Generation 23. The processing block of Trajectory Plan 22 and the processing block of Command Generation 23 are respectively similar to the processing block of Trajectory Plan 22 and the processing block of Command Generation 23 described in the embodiment.

The motor controller 9 includes a multi-axis servo controller 51, a uni-axis servo controller 52, and a feeding controller 53. With this configuration, the motor controller 9 performs feeding control based on the servo control signal input from the upper-level controller 8 to obtain driving power, and feeds the driving power to the drive motors.

The multi-axis servo controller 51 implements the function specified in the processing block of Robot Motion Control 24 equivalent to Robot Motion Control 24 described in the embodiment. The uni-axis servo controller 52 implements the function specified in the processing block of Angle-Speed-Current Control 32 equivalent to Angle-Speed-Current Control 32 described in the embodiment. The feeding controller 53 implements the function specified in the processing block of Inverter Control 34 equivalent to Inverter Control 34 described in the embodiment.

With this software system configuration, the controller 200 according to the comparative example functions in a similar manner as a whole to the controller 100 according to the embodiment.

Features of the Embodiment

As described above, robots, manipulators, NC units, and other multi-axis control machines have a plurality of cooperating drive axes. In order to make such multi-axis control machine perform work according to a predetermined procedure, a large number of arithmetic and/or logic processings are performed in a complicated and closely related manner. In view of the large number of arithmetic and/or logic processings, the controller for the multi-axis control machine is in many cases connected with a plurality of kinds of units each equipped with an arithmetic and/or logic processing unit (CPU) so that the large number of arithmetic and/or logic processings are shared among the plurality of kinds of device units.

The controller 200 according to the comparative example illustrated in FIG. 3 includes broadly two function units with control signals sent and received between the two function units. The entire configuration of the controller 200, including the two function units and specifications of the control signals, can be designed as a dedicated controller that causes a work robot with particular specifications to perform particular work. This enables the controller dedicated to a particular robot to be reduced in size and cost.

More recently, there is a need for versatile controllers that can control various kinds of work robots designed to meet various mechanism conditions and be used in various work applications. When such versatile controller is used to implement a system suitable for specifications of a work robot and for its intended purpose, it is necessary to secure a degree of design freedom for the device units constituting the controller and then eliminate or minimize redundancy in the hardware resources of the device units. That is, it is necessary to secure a degree of system design freedom at which each of the device units can be re-designed into a hardware configuration that has minimal possible performance and specifications necessary for the intended purpose.

In this respect, it is assumed that such device units are applied to the two function units of the dedicated controller 200 according to the above-described comparative example. In this case, none of the two device units can be implemented until specifications, including mechanism conditions, of the work robot 6 are determined, since processing details of the two device units depend on the mechanism conditions of the work robot 6. Additionally, each of the two device units has its own special, exclusive connection specifications (that is, the contents of the command signals sent and received are closed to public). This makes it necessary to purchase and use the two device units in pairs. Furthermore, the upper-level system 42 and the multi-axis motion controller 43 of the upper-level controller 8 are integral to each other. The integral configuration makes it impossible or difficult to simplify the configuration of the upper-level system 42 alone when the work involved in the upper-level system 42 is simple. This may cause redundancy in the hardware resources of the upper-level system 42 and the multi-axis motion controller 43. Thus, the configuration of the controller 200 according to the comparative example provides no or a low level of compatibility between the device units, resulting in a lower degree of design freedom. For the controller 200 to have versatility, an increase in size and cost of the controller 200 is involved. These considerations on the controller 200 according to the comparative example also apply when the device units are determined according to any other manner of classification, that is, when the device units are other than the upper-level controller 8 and the motor controller 9.

In contrast, in the controller 100 according to the embodiment illustrated in FIG. 2, the plurality of kinds of device units of the controller 100 each perform, upon receipt of a control signal from another device unit, the control function specified in the processing block of the device unit. The control signal is compliant with a predetermined interface standard determined according to the control function. This configuration enables the device units to be customized while securing cooperative processing functions and connection compatibility among the device units. Thus, the controller 100 has a higher degree of design freedom.

The controller 100 according to this embodiment includes three device units, namely, the work control unit 3, the multi-axis motion control unit 4, and the drive control units 5. This configuration ensures that details (work, motion, and drive control) of the control processing of the work robot 6 are classified according to function and assigned to different device units, and that each of the device units performs arithmetic and/or logic processing corresponding to the function assigned to the device unit.

These two features of this embodiment will be described in more detail below.

Interface Standard

As described above, the device units of the controller 100 according to this embodiment are capable of implementing respective interface-associated processing blocks, namely, Work Control Interface 11, Motion Control Interface 21, and Drive Control Interface 31. Each device unit, at the corresponding processing block, receives a control signal from another device unit. The control signal is compliant with a predetermined interface standard determined according to the control function corresponding to the processing block implemented by each device unit. Upon receipt of the control signal, each device unit implements a control function corresponding to another processing block of the same device unit.

As used herein, the term interface standard refers to a standard that uses a software-associated protocol upper in level than communications protocols for connection buses. Specifically, the interface standard includes an interface standard for the work control signal, an interface standard for the motion control signal, and an interface standard for the drive control signal. Each interface standard provides specifications associated with the corresponding to the control signal, such as commands, parameters, and information interchanging.

In this embodiment, the interface standard for Work Control Interface 11 of the work control unit 3, the interface standard for Motion Control Interface 21 of the multi-axis motion control unit 4, and the interface standard for Drive Control Interface 31 of the drive control unit 5 are open to public. When an interface standard is described as "open to public", this means that the interface standard is available to anyone in the form of a product manual or a specification sheet. The product manual or specification sheet may be available in the form of data obtained through network communication or from a recording medium or in the form of a widely distributed booklet. That is, each interface standard is open to public so that any other production makers than the production maker of the controller 100 can use the interface standard. This configuration ensures that even when the device units are made by various other production makers or self-made by a user of the robot system, compliance with the interface standards enables any of the device units to be selectively used with improved compatibility between the device units, regardless of who makes the device units.

The processing blocks implemented by the CPU of the work control unit 3 may be programmable in any desired manner. For this purpose, the interface standard for Work Control Interface 11 of the work control unit 3 may be externally programmable using, for example, a predetermined programming language such as C language, and store and execute the resulting program. In this case, the console 2 serves the purpose of an interface for coding the program of the work control unit 3.

Three-unit Configuration

As described above, the controller 100 according to this embodiment includes three device units, namely, the work control unit 3, the multi-axis motion control unit 4, and the drive control units 5. This configuration ensures that details (work, motion, and drive control) of the control processing of the work robot 6 are classified according to function and assigned to different device units, and that each of the device units performs arithmetic and/or logic processing corresponding to the function assigned to the device unit.

For example, the work control unit 3 can be designed in any desired manner by a user of the robot system 1 according to details and load of the processing associated with the work that is to be performed by the work robot 6. In this embodiment, the work control unit 3 is capable of implementing an Application Programming Interface (API) group that is compliant with the interface standard for Motion Control Interface 21 of the multi-axis motion control unit 4. The API group can be rephrased as command group, function group, or software library.

The work robot 6 has mechanism conditions such as: each drive motor's arrangement, posture, output, and reduction gear ratio; each arm's length and inertia; and setting coordinate system. These mechanism conditions depend on the multi-axis motion control unit 4's processing alone. That is, it is solely the multi-axis motion control unit 4 that needs to be prepared and set according to specifications of the work robot 6. This configuration eliminates or minimizes the influence that the mechanism conditions of the work robot 6 have on the design of the other device units. That is, the work control unit 3 and the drive control units 5 can be designed even when specifications of the work robot 6, which is the control target of these control units, are undetermined yet.

Each of the drive control units 5 can be selectively assigned to a drive motor, among the drive motors of the work robot 6, whose capacity is suitable for the drive control unit 5. This improves the simplicity and functionality with which the drive control units 5, including the general-purpose servo amplifier 61, are applied to the drive motors of the work robot 6.

The multi-axis motion control unit 4, the drive control units 5, and the work robot 6 may be combined into a hardware control set that is compatible with the work control unit 3 (work application). The multi-axis control machine to be controlled may be a stage unit or a linear slider. Stage units and linear slides are simpler in configuration and more rigid than the work robot 6. Controlling a stage unit or a linear slider, therefore, may not necessarily involve the inverse kinematics at Command Generation 23 and the vibration prevention processing at Robot Motion Control 24. When the multi-axis control machine to be controlled is this simple in configuration, at least one processing block of the multi-axis motion control unit 4 may be omitted, and the work control unit 3 and the multi-axis motion control unit 4 may be combined into a hardware set that is compatible with the drive control units 5.

ADVANTAGEOUS EFFECTS OF THIS EMBODIMENT

As has been described hereinbefore, the controller 100 according to this embodiment includes a plurality of kinds of device units connected to each other. Each of the device units performs its own control function upon receipt of a control signal from another device unit among plurality of kinds of device units. The control signal is compliant with a predetermined interface standard determined according to the control function. This configuration enables the device units to be customized while securing cooperative processing functions and connection compatibility among the device units. Thus, the controller 100 has a higher degree of design freedom and improved versatility.

Also in this embodiment, the interface standards are open to public. This configuration ensures that even when the device units are made by various other production makers or self-made by a user, compliance with the interface standards enables any of the device units to be selectively used, regardless of who makes the device units. This facilitates securing connection compatibility between the device units.

Also in this embodiment, the device units include the work control unit 3, the multi-axis motion control unit 4, and the drive control units 5. The work control unit 3 controls work that is to be performed by the work robot 6. The multi-axis motion control unit 4 controls a motion of each of the plurality of drive motors of the work robot 6 so as to implement the work controlled by the work control unit 3. The drive control units 5 controls power feeding driving of each of the plurality of drive motors so as to implement the motion controlled by the multi-axis motion control unit 4. This configuration ensures that details (work, motion, and drive control) of the control processing of the work robot 6 are classified according to function and assigned to different device units, and that each of the device units performs arithmetic and/or logic processing corresponding to the function assigned to the device unit. This configuration increases the degree of design freedom of the controller 100.

Also in this embodiment, the work control unit 3 is capable of implementing an Application Programming Interface (API) group that is compliant with the interface standard for Motion Control Interface 21 of the multi-axis motion control unit 4. Specifically, the work control unit 3 receives various API commands from the console 2, which is upper in level than the work control unit 3, and executes the API commands. This configuration enables the work control unit 3 to perform control processing with a higher degree of freedom.

Also in this embodiment, the multi-axis motion control unit 4 controls the motion of each of the plurality of drive motors of the work robot 6 based on mechanism conditions of the work robot 6 set in any desired manner. This ensures such a simplified configuration that the multi-axis motion control unit 4 alone performs arithmetic and/or logic processing that takes the mechanism conditions of the work robot 6 into consideration, eliminating or minimizing the influence that the mechanism conditions of the work robot 6 might have on the arithmetic and/or logic processing performed by the work control unit 3 and the drive control units 5. As a result, the compatibility between the device units of the controller 100 improves.

Figure 4:
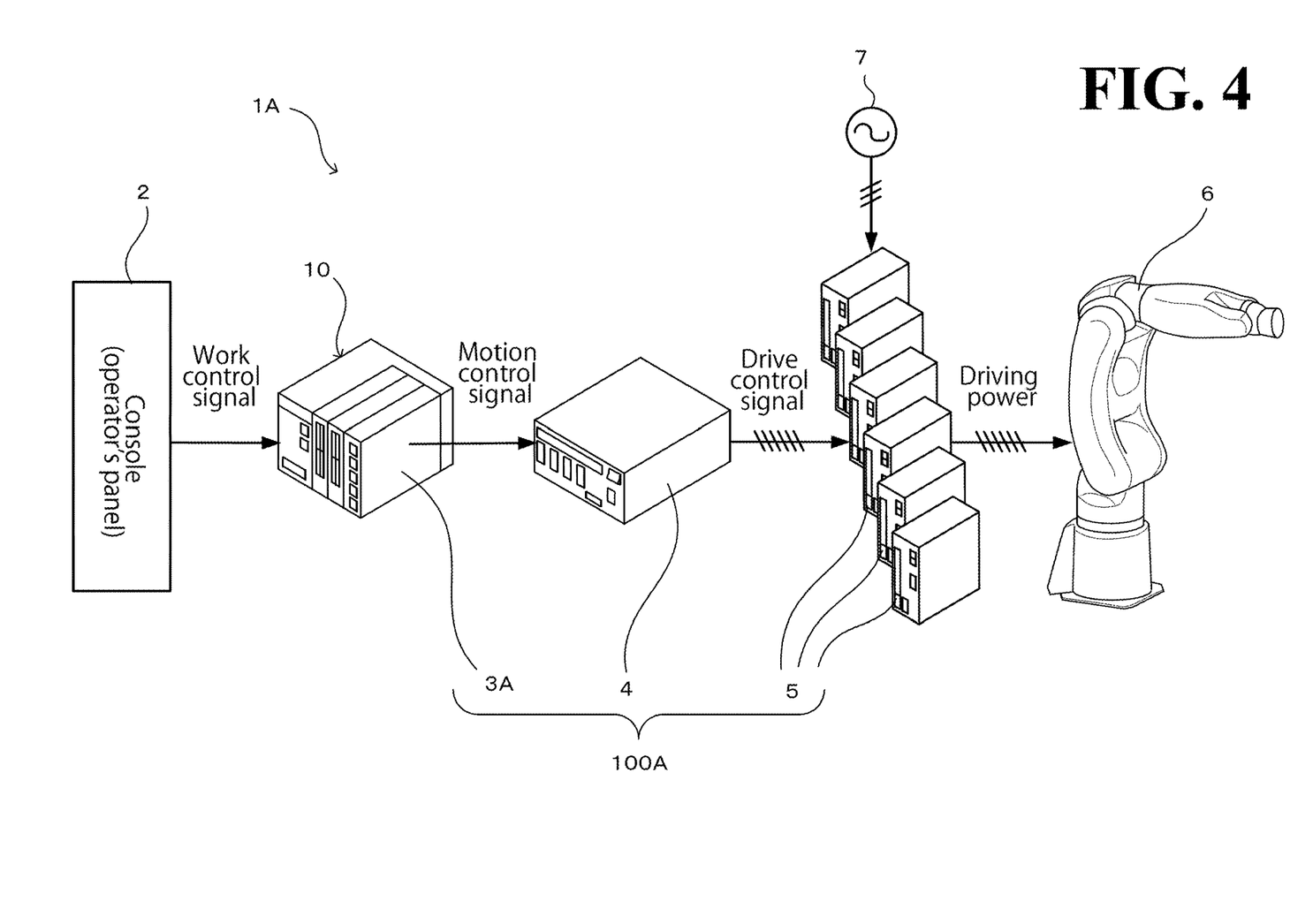
FIG. 4 is a schematic of a hardware unit configuration of a robot system that includes a work control unit implemented by a PLC module.

In the above-described embodiment, the work control unit 3 is a single device unit capable of implementing the API group compliant with the interface standard for Motion Control Interface 21 of the multi-axis motion control unit 4. This configuration, however, is not intended in a limiting sense. In another possible embodiment, the work control unit 3 is capable of executing a ladder program compliant with the interface standard for Motion Control Interface 21 of the multi-axis motion control unit 4. This possible embodiment is illustrated in FIG. 4. Referring to FIG. 4, a work control unit 3A is a PLC module built in a programmable logic controller (PLC) 10. This configuration ensures a firmer and simpler design of the work control unit.

As used herein, the terms "perpendicular", "parallel", and "plane" may not necessarily mean "perpendicular", "parallel", and "plane", respectively, in a strict sense. Specifically, the terms "perpendicular", "parallel", and "plane" mean "approximately perpendicular", "approximately parallel", and "approximately plane", respectively, with design-related and production-related tolerance and error taken into consideration.

Also, when the terms "identical", "same", "equivalent", and "different" are used in the context of dimensions, magnitudes, sizes, or positions, these terms may not necessarily mean "identical", "same", "equivalent", and "different", respectively, in a strict sense. Specifically, the terms "identical", "same", "equivalent", and "different" mean "approximately identical", "approximately same", "approximately equivalent", and "approximately different", respectively, with design-related and production-related tolerance and error taken into consideration.

Otherwise, the above-described embodiments and modifications may be combined in any manner deemed suitable.

Obviously, numerous modifications and variations of the present disclosure are possible in light of the above teachings. It is therefore to be understood that within the scope of the appended claims, the present disclosure may be practiced otherwise than as specifically described herein.

What is claimed is:

1. A controller, comprising:
a plurality of control function circuits connected to each other and configured to control a multi-axis control machine,
wherein at least one of the control function circuits is configured to perform a respective control function upon receipt of a control signal from another control function circuit of the plurality of control function circuits, and the control signal corresponds to a predetermined interface standard determined from the control function, and
wherein the plurality of control function circuits includes
a work control circuit configured to control work that is to be performed by the multi-axis control machine,
a multi-axis motion control circuit configured to control motion of each of drive axes of the multi-axis control machine to implement the work controlled by the work control circuit, the multi-axis motion control circuit being configured to control the motion of each of the drive axes by determining a trajectory plan, generating an angle command, a speed command, or a torque command, and correcting the angle command, the speed command, or the torque command based on a mechanism condition that includes an arrangement of each of the drive axes, a posture of each of the drive axes, an output of each of the drive axes, or a reduction gear ratio of each of the drive axes, and
a drive control circuit configured to control power feed driving of each of the drive axes to implement the motion controlled by the multi-axis motion control circuit, wherein
the multi-axis motion control circuit determines the trajectory plan, generates the angle command, the speed command, or the torque command, and corrects the angle command, the speed command, or the torque command, without the work control circuit and the drive control circuit determining the trajectory plan, generating the angle command, the speed command, or the torque command, and correcting the angle command, the speed command, or the torque command.

2. The controller according to claim 1, wherein the predetermined interface standard is a public standard.

3. The controller according to claim 1, wherein the work control circuit is further configured to execute an application programming interface corresponding to an interface standard for the multi-axis motion control circuit.

4. The controller according to claim 1, wherein the work control circuit is configured to execute a ladder program corresponding to an interface standard for the multi-axis motion control circuit.

5. A multi-axis motion control device, comprising:
a multi-axis motion control circuit configured to
upon receipt of a control signal from a work control circuit, which is configured to control work that is to be performed by a multi-axis control machine and which is connected to the multi-axis motion control circuit, execute a motion control function that controls a motion of each of drive axes of the multi-axis control machine by determining a trajectory plan, generating an angle command, a speed command, or a torque command, and correcting the angle command, the speed command, or the torque command based on a mechanism condition that includes an arrangement of each of the drive axes, a posture of each of the drive axes, an output of each of the drive axes, or a reduction gear ratio of each of the drive axes, wherein the control signal corresponds to a motion control interface standard determined from the motion control function, and
output to a drive control circuit a drive control signal corresponding to the motion control function, wherein
the multi-axis motion control circuit determines the trajectory plan, generates the angle command, the speed command, or the torque command, and corrects the angle command, the speed command, or the torque command, without the work control circuit and the drive control circuit determining the trajectory plan, generating the angle command, the speed command, or the torque command, and correcting the angle command, the speed command, or the torque command.

6. The controller according to claim 1, wherein
the work control circuit controls the work that is to be performed by the multi-axis control machine, without directly controlling the motion of each of the drive axes and without directly controlling the power feed driving of each of the chive axes.

7. The controller according to claim 1, wherein the multi-axis motion control circuit performs processing that takes the mechanism condition set for the multi-axis control machine into account, without the work control circuit and the drive control circuit performing the processing that takes the mechanism condition into account.

8. The controller according to claim 1, wherein the drive control circuit is configured to control the power feed driving of each of the drive axes to implement the motion controlled by the multi-axis motion control circuit, without the multi-axis motion control circuit directly controlling the power feed driving of each of the drive axes.

9. The controller according to claim 1, wherein
the trajectory plan includes a trajectory that a leading end of an arm of the multi-axis control machine should follow on a setting coordinate system, and
the multi-axis control machine is configured to control the motion of each of the drive axes based on a plurality of mechanism conditions including the arrangement of each of the drive axes, the posture of each of the drive axes, the output of each of the drive axes, the reduction gear ratio of each of the drive axes, as well as length and inertia of the arm, and the setting coordinate system.

* * * * *